United States Patent
Vila

(10) Patent No.: US 6,905,144 B2
(45) Date of Patent: Jun. 14, 2005

(54) SPRING-LOADED 'L'-SHAPED SEAL RING

(75) Inventor: Smail Vila, Louisville, KY (US)

(73) Assignee: Delaware Capital Formation, Wilmington, DE (US)

( * ) Notice: Subject to any disclaimer, the term of this patent is extended or adjusted under 35 U.S.C. 154(b) by 55 days.

(21) Appl. No.: 10/612,498

(22) Filed: Jul. 2, 2003

(65) Prior Publication Data

US 2005/0001423 A1 Jan. 6, 2005

(51) Int. Cl.$^7$ .......................... F16L 21/02; F16L 27/00
(52) U.S. Cl. ...................... 285/223; 285/369; 285/231; 285/235; 285/417; 285/910; 277/589
(58) Field of Search ................................ 285/223, 231, 285/232, 235, 369, 417, 910, 918; 277/589, 607, 616

(56) References Cited

U.S. PATENT DOCUMENTS

| 671,696 | A | | 4/1901 | Hammon |
|---|---|---|---|---|
| 2,085,922 | A | | 7/1937 | Moore |
| 2,286,566 | A | | 6/1942 | Norton |
| 2,538,683 | A | | 1/1951 | Guiler et al. |
| 2,598,094 | A | | 5/1952 | Augereau |
| 2,638,362 | A | | 5/1953 | Sherman et al. |
| 2,693,378 | A | | 11/1954 | Beyer |
| 2,826,437 | A | * | 3/1958 | Detweiler et al. ........... 285/233 |
| 3,129,021 | A | * | 4/1964 | Willis et al. ................ 285/233 |
| 3,213,187 | A | * | 10/1965 | Kish ......................... 174/84 S |
| 3,405,957 | A | * | 10/1968 | Chakroff ...................... 285/93 |
| 3,574,358 | A | | 4/1971 | Cassel |
| 3,667,785 | A | | 6/1972 | Kapeker |
| 3,680,874 | A | | 8/1972 | Schwarz |
| 4,008,937 | A | * | 2/1977 | Filippi ......................... 439/192 |
| 4,146,254 | A | | 3/1979 | Turner et al. |
| 4,294,475 | A | * | 10/1981 | Kanai et al. ............. 285/145.4 |
| 4,311,313 | A | | 1/1982 | Vedova et al. |
| 4,316,053 | A | | 2/1982 | Rieffle |
| 4,641,861 | A | | 2/1987 | Scoboria |
| 4,871,181 | A | | 10/1989 | Usher et al. |
| 5,106,129 | A | | 4/1992 | Camacho et al. |
| 5,265,890 | A | | 11/1993 | Balsells |
| 5,314,213 | A | * | 5/1994 | Heister et al. .............. 285/231 |
| 6,042,154 | A | | 3/2000 | Gensert et al. |
| 6,142,536 | A | * | 11/2000 | Wolfsdorf ................... 285/112 |
| 6,161,838 | A | | 12/2000 | Balsells |
| 6,179,339 | B1 | | 1/2001 | Vila |
| 6,224,064 | B1 | | 5/2001 | St. Germain |
| 6,585,270 | B2 | | 7/2003 | Tong |

* cited by examiner

Primary Examiner—James M. Hewitt
(74) Attorney, Agent, or Firm—Franklin L. Gubernick

(57) ABSTRACT

A sealing system adapted for placement into an exterior groove of a structure. The sealing system includes a seal ring having a generally 'L'-shaped cross-section. The sealing system further includes a canted-coil spring. The seal ring includes an inner surface, an outer surface and two side surfaces. The seal ring's inner surface features a groove that increases the ring's flexibility. The seal ring's outer surface protrudes outwardly until it is pushed inwardly through contact with an inner surface of an external structure. As the outer surface moves inwardly, it causes a compression of the spring while a part of the seal ring flexes and bends about the seal ring's groove. At the same time, the outer surface becomes reoriented in a manner that cause its shape to change to a flatter configuration that is more complementary to the inner surface of the internal structure.

27 Claims, 6 Drawing Sheets

SPRING-LOADED 'L'-SHAPED SEAL RING

FIELD OF THE INVENTION

The invention is in the field of sealing devices that create a barrier to the passage of a fluid. More particularly, the invention is a sealing system that includes a unique seal ring in combination with a complementary spring member. In the preferred manner of use, where the seal ring is exposed to a high-temperature fluid in a flexible coupling, the seal ring is made of a heat-resistant PTFE-based material. The sealing system is also taught in a flexible coupling that has a uniquely-shaped inner surface that biases the travel and angular movement of the structure having the seal ring.

The seal ring is in the form of an annulus that has a generally 'L'-shaped cross-section. To facilitate installation of the seal ring and to enhance its performance, the ring's outermost surface includes an arcuately-shaped leading portion and a downwardly-angled trailing portion, while the ring's inner-facing surface features a relief groove. In the preferred embodiment, the spring used in combination with the seal ring is of the type known as a canted-coil spring.

BACKGROUND OF THE INVENTION

Piping systems designed for high temperature fluids usually require specialized seals at various points in the system. Such points may be found where a connection is made between two or more adjacent piping sections and/or where a component is connected to a section of pipe. A specialized type of flexible connection is present in many systems to enable the system to compensate for movement or misalignment between the system's pipes and/or connected components. An example of a system that typically employs a flexible connection in the form of a flexible coupling (also known as a flexible joint) is the bleed air system used in jet aircraft. The system distributes bleed air from a jet engine through a duct system to accomplish various functions, such as engine cooling and bleeding, cabin temperature control or de-icing of portions of the plane's exterior surface. It should be noted that the words pipe, duct, conduit, tube and tubular structure are all herein broadly defined as any tubular structure, or even cylindrical opening, through which a fluid can travel, and are considered equivalent and may be used interchangeably.

Typically, a bleed air system will employ at least one flexible joint to connect adjacent duct sections, or to connect a section of duct to a component. The joint includes structure that enables it to compensate for misalignments of the ductwork, elongation or contraction of the ductwork brought about by temperature changes, and/or movements of the engine or aircraft structure due to various factors including vibration, changes in engine speed and/or loading, and air turbulence.

In the prior art, a number of different seals have been employed in flexible couplings used in aircraft bleed air systems. Since the air flowing through the system can have a temperature of almost 600 degrees Fahrenheit, most prior art seals deployed in such a system are made of a heat-resistant material such as a specialized silicone or PTFE (also known as, and used herein interchangeably with, Polytetrafluoroethylene and TEFLON). These prior art seals typically feature a generally rectangular cross-section, with perhaps a crowned outermost surface to maximize their sealing effectiveness. An example of a flexible joint used in a bleed air system is taught by Camacho et al in U.S. Pat. No. 5,106,129 entitled Flexible Coupling for Transferring a Fluid Between Two Fluid Conduits. In the Camacho et al patent, it is noted that the crowned surface of prior art seal rings can wear down due to vibration and rubbing. Once worn, the seal can lose its effectiveness and allow fluid leakage. It is also well known in the art that prolonged exposure to high-temperature air can cause a seal made of a silicone material to become brittle and burnt, with a resultant loss of integrity that leads to fluid leaking past the seal. Once the fluid, high temperature air in a bleed air system, gets past the seal, the fluid will cause increased noise and reduced efficiency. A leaking seal must eventually be replaced, a process that can be both costly and time consuming.

To overcome the above-described problems, it is known to fashion seals from PTFE with various modifications to improve the seal's flexibility, durability and life expectancy. An example of such a seal is taught in my prior, U.S. Pat. No. 6,179,339, entitled Seal Rings for Low Loss Flexible Coupling of Gas Conduits. In the patent, I discuss the noted problems with prior art seals and teach the use of a pair of grooves in a PTFE seal ring to enhance the seal's flexibility. The seal ring is used in combination with a garter spring whereby the spring continuously applies pressure on the seal ring to maintain and maximize the seal's contact with adjacent structure. When the seal ring is to be used in an expansion mode, where the spring applies an outward force on the seal ring, I teach the use of a Marcel spring with the seal ring. However, a typical installation of the seal ring requires that the seal ring be cut, thereby affecting the seal's integrity and creating a potential leak path.

It is also known in the seal art to employ seal rings that have an 'L'-shaped cross-section. Installation of this type of seal, if the seal is made of a substantially rigid material such as PTFE, can be difficult and normally requires that the seal be cut, with a consequent adverse affect on the seal's integrity and the creation of a potential leak path.

SUMMARY OF THE INVENTION

The invention is a sealing system that makes use of an annular seal ring in combination with a spring that continually urges the seal ring in an outward direction. The seal ring has an 'L'-shaped cross-section, unique radially-located outer-facing and inner-facing surfaces, and is preferably made of a heat-resistant PTFE or PTFE composite material.

The radially-located outer-facing surface (also referred to herein as the outer surface) of the seal ring has a configuration, when in an non-loaded state, that features an off-center, outwardly-protruding and arcuately-shaped leading portion followed by a downwardly-sloping trailing portion. To increase the seal ring's flexibility, and to enhance its ability to transfer load forces to the spring, the seal ring's radially-located inner-facing surface (also referred to herein as the inner surface) features a planar leading portion separated from a dual-contoured trailing portion by an endless groove. The seal ring's extended side surface formed by the foot portion of the seal's 'L'-shaped configuration provides for maximum contact with a sidewall of a groove adapted for receiving the sealing system. As a result, a broad distribution of load forces is achieved in combination with maximum sealing effectiveness between the seal ring and the surfaces that it contacts.

In the preferred embodiment, the spring used in combination with the above-described seal ring is a canted-coil spring. Springs of this type are compressed using force directed at the sides of the spring's coils. In this manner, the spring provides uniform stress distribution, even when subjected to point or localized loading. Furthermore, the nature of a canted-coil spring enables it to have a high degree of compressibility, thereby facilitating installation of the seal ring. When the sealing system is to be used in a high temperature environment, a canted-coil spring made of a metal material is preferred due to its ability to withstand high temperatures, maintain a consistent spring rate and provide a high level of reliability.

Once a sealing system in accordance with the invention has been installed in an exterior groove of a structure, insertion of that structure into a complementary cylindrical opening in another structure will cause pressure to be applied to the seal ring's outer surface. Since the seal ring's leading portion protrudes outwardly, this will cause a bending moment in the seal ring that will result in a reorientation of the seal ring's outer surface as a major portion of the seal ring is forced downwardly and flexes and bends about the seal ring's groove. The reorientation of the seal ring's outer surface causes said surface to assume a flatter shape to thereby improve its sealing contact with the inner surface of the structure that it is contacting.

In the preferred embodiment, the sealing system would be used to seal relatively movable portions of a flexible coupling that comprises at least one cylindrical seal ring holder received within an inner area of a sleeve. The seal ring and spring, both in an uncut condition, are located in an endless groove situated on the exterior surface of the seal ring holder. The spring maintains an outwardly acting expansion load/force on the seal ring, thereby pressing the seal ring's outer surface into the inner surface of the sleeve. System pressure will further press the seal ring into its mating surfaces to thereby achieve a leakage-free contact with the inner surface of the sleeve, even if there is a misalignment, or relative movement, between the seal ring holder and the sleeve. In one taught embodiment of a sleeve, the sleeve features a unique interior area that biases the travel of the seal ring holder.

The invention thereby forms a sealing system that avoids the previously noted deficiencies of the prior art. When the seal ring is made of a PTFE material, a seal is thereby provided that is easier to install and has a flexibility, durability, and an ability to be installed without being cut, that is not found in prior art seal ring systems or seal rings. As a result, a sealing system in accordance with the invention has a unique sealing capability and a long service life.

DETAILED DESCRIPTION OF THE DRAWINGS

Figure 2:
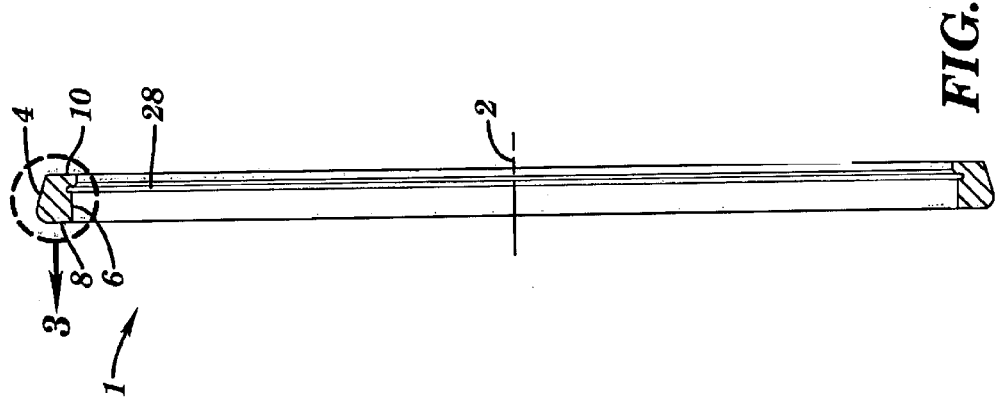
FIG. 2 is a cross-sectional view of the seal ring shown in FIG. 1, taken at the plane labeled 2—2 in FIG. 1.
Figure 1:
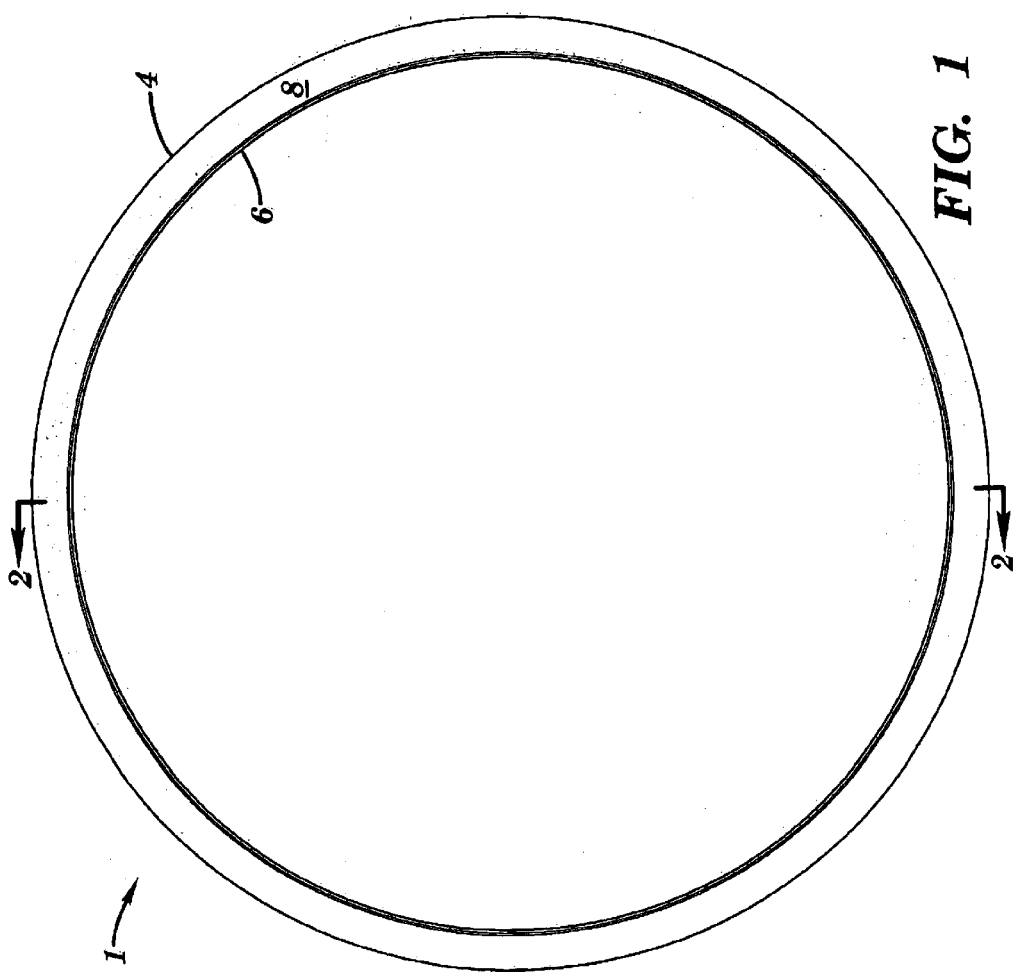
FIG. 1 is a front view of a seal ring in accordance with the invention.

Referring now to the drawings in greater detail, wherein like characters refer to like parts throughout the several figures, there is shown by the numeral 1 a seal ring in accordance with the invention.

The seal ring 1 is in the form of an annulus that is symmetrical about a center axis 2 (note FIG. 2). The seal ring features a radially-located outer surface 4 that faces, in a radial direction, away from the center axis 2. The seal ring also features a radially-located inner surface 6 that faces, in a radial direction, toward the center axis 2. The seal ring further includes front and rear side surfaces, 8 and 10 respectively, that face in opposite directions and are oriented substantially perpendicular to the center axis 2.

Figure 3:
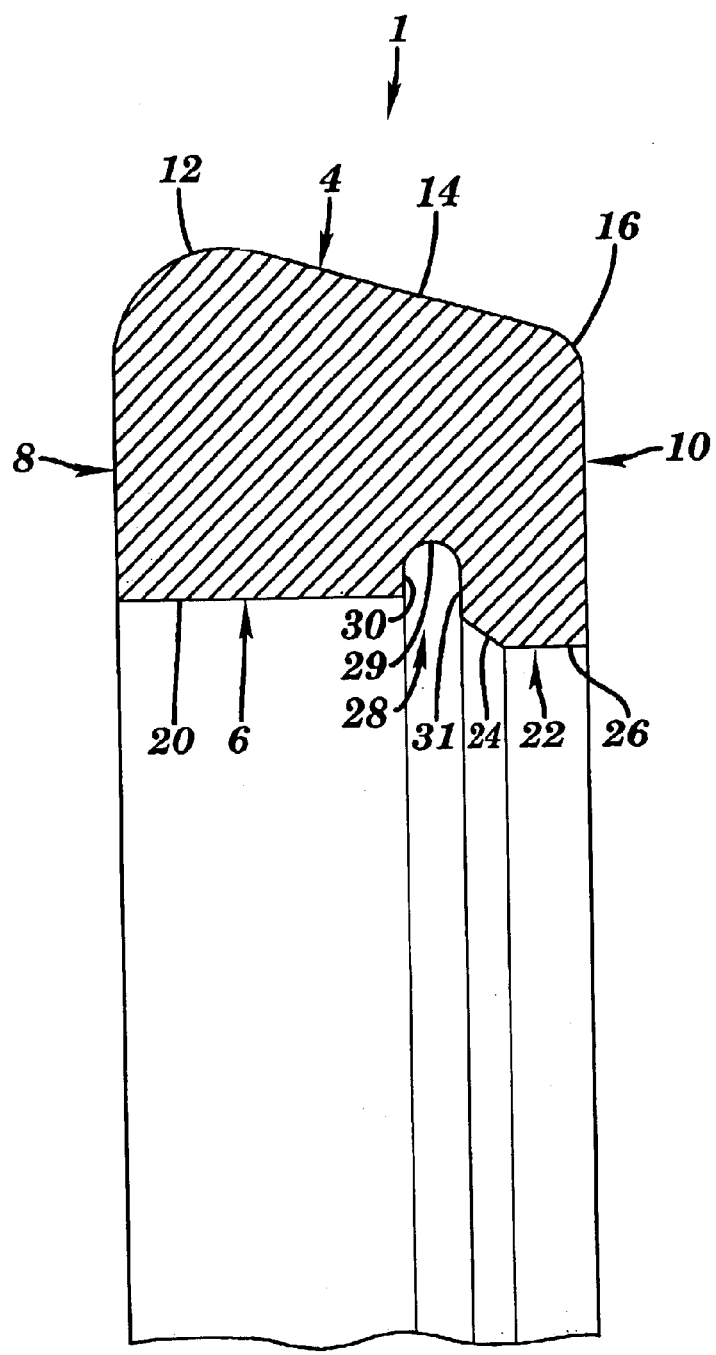
FIG. 3 is a magnified cross-sectional view of a portion of the seal ring shown in FIG. 1, as indicated by the labeled circle in FIG. 2.

FIG. 3 provides a magnified cross-sectional view of a portion of the seal ring 1. In this view, one can see that the seal ring's front and rear side surfaces, 8 and 10 respectively, have a substantially planar configuration and are parallel to each other. One can also see the seal ring's 'L'-shape with surface 8 forming the top of the 'L' and surface 10 forming its bottom. While an 'L'-shape is preferred to maximize the length of surface 10, the seal ring could have other shapes. For example, it could have a somewhat rectangular shape if one were to reduce the length of surface 10.

The seal ring's outer surface 4 includes an arcuately-shaped, outwardly-protruding leading portion 12 located adjacent a straight, downwardly-sloping trailing portion 14. The leading portion 12 preferably accounts for about one-quarter of the length of surface 4. Located at the end of portion 14 is a rounded rear edge 16. It should be noted that an outwardly protruding surface portion is herein defined as a surface portion that extends outwardly relative to a low point on the overall surface. In the invention, since surface portion 12 is off-center, pressing on said surface will create a bending moment within the seal ring. It should also be noted that the words "leading" and "trailing" are relative to the structure and not to the orientation of said structure after installation.

The seal ring's inner surface 6 includes a flat/planar, horizontally-oriented leading portion 20 that preferably accounts for slightly more than one-half of the surface's length. Surface 6 further includes a trailing portion 22 consisting of a straight/planar, downwardly-angled (per FIG. 3) first portion 24 and a straight/planar, horizontally-oriented second portion 26. Trailing portion 22 is separated from the leading portion 20 by a relatively narrow endless groove 28, also referred to herein as a relief groove. The groove has a rounded bottom 29 and first and second sidewalls, 30 and 31 respectively. Groove 28 extends along the complete length of the seal ring's inner surface. One should note that when the seal ring is in an unloaded condition, the groove's sidewalls 30 and 31 are parallel to each other. One should also note that groove 28 is located in the rear half of the seal ring whereby it is closer to the seal ring's rear surface 10 than it is to the seal ring's front surface 8.

In the preferred embodiment, seal ring 1 is used in a system in which the seal ring will be exposed to a high temperature fluid. When used in such a system, the seal ring will preferably be made of a heat-resistant plastic material, such as PTFE, a PTFE composite material in which the PTFE is combined with one or more other materials such as EKONOL or FLUROSINT, or some silicone materials. It should be noted that the seal ring can be made of any material that provides sufficient compressibility, resilience and flexibility to enable the seal to conform, in a sealing manner, to an adjacent structure while still being relatively stable during its exposure to the physical and chemical conditions of the system in which it is installed. For example, when the seal ring will be exposed to a fluid, such as air, at a moderate temperature, the seal ring can be made out of a basic resilient material, such as rubber.

A sealing system in accordance with the invention combines the taught seal ring 1 with a spring 32 that is positioned whereby it will continuously exert an expansion force on the seal ring. In this manner, the seal ring is always in an expansion mode with the spring acting to maximize the seal's effectiveness for a prolonged period of time. Furthermore, once the seal ring is installed in a system, it will be energized by both the spring and the system fluid.

In the preferred embodiment, the spring 32 is in the form of a canted-coil spring made up of a plurality of elliptically-shaped connected coils. To understand the function of the spring, it is advantageous to examine the sealing system both when said system is in an installed condition, in a free state where it is not compressed, and during its installation.

Figure 4:
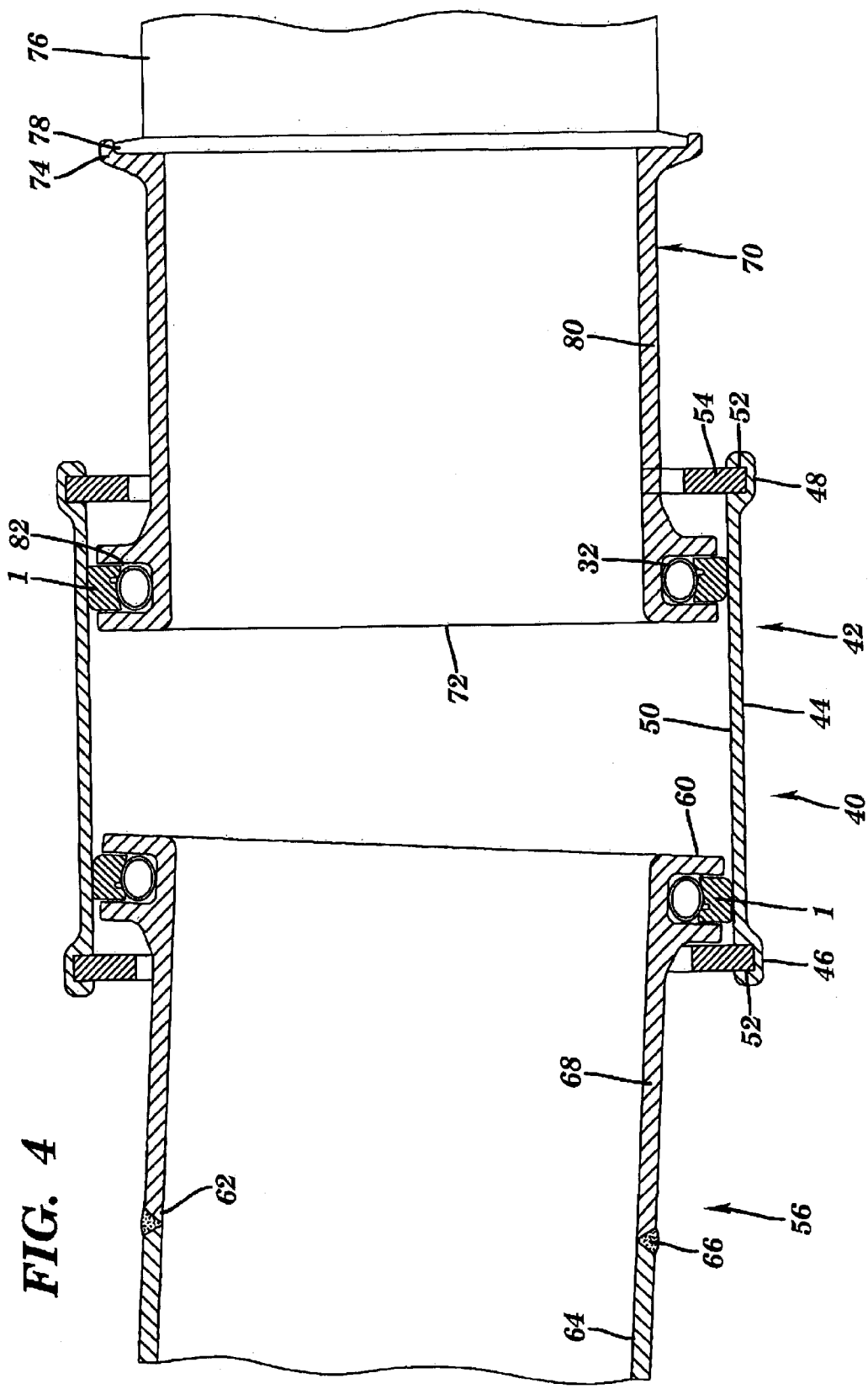
FIG. 4 provides a cross-sectional view of a first embodiment of a flexible coupling that employs a sealing system in accordance with the invention.

FIG. 4 shows a sealing system in accordance with the invention installed in two places within a first embodiment of a flexible coupling 40. The coupling includes a center-located tubular sleeve 42 having a center portion 44 and first and second end portions, 46 and 48 respectively. Each end portion has an outer diameter greater than that of the center portion.

The sleeve includes a cylindrical inner area defined by the sleeve's inner surface 50. Surface 50 is preferably smooth and includes two endless grooves 52, with each of said grooves located at opposite ends of the sleeve. A removable lock ring 54 is located in each groove 52.

Extending through the left-hand end portion 46 of the sleeve is a first seal ring holder 56. The holder has a first end portion 60 located within the sleeve, and a second end portion 62 connected to an adjacent pipe 64 by a weld 66 or other conventional securement method. The holder 56 includes an elongated body portion 68 located between its two end portions.

Extending through the right-hand end portion 48 of the sleeve is a second seal ring holder 70. The holder 70 has a first end portion 72 located within the sleeve, and a second end portion 74 that is in the form of a flange. The flange enables holder 70 to be connected via a standard flanged connection (specific connecting details are not shown) or other form of conventional connecting mechanism to an adjacent pipe/tubular structure 76 that includes a flanged end 78. The holder 70 includes an elongated body portion 80 located between its two end portions.

Both seal ring holders are prevented from detaching from the sleeve by the lock rings 54, and are sealingly-engaged to the interior surface 50 of the sleeve using a sealing system in accordance with the invention. The sealing system allows said seal ring holders to move both longitudinally and laterally within the sleeve while maintaining the sealed integrity of the coupling. Since identical sealing systems are employed in both seal ring holders, a description of one of said sealing systems will be applicable to both of said seal ring holders.

Figure 5:
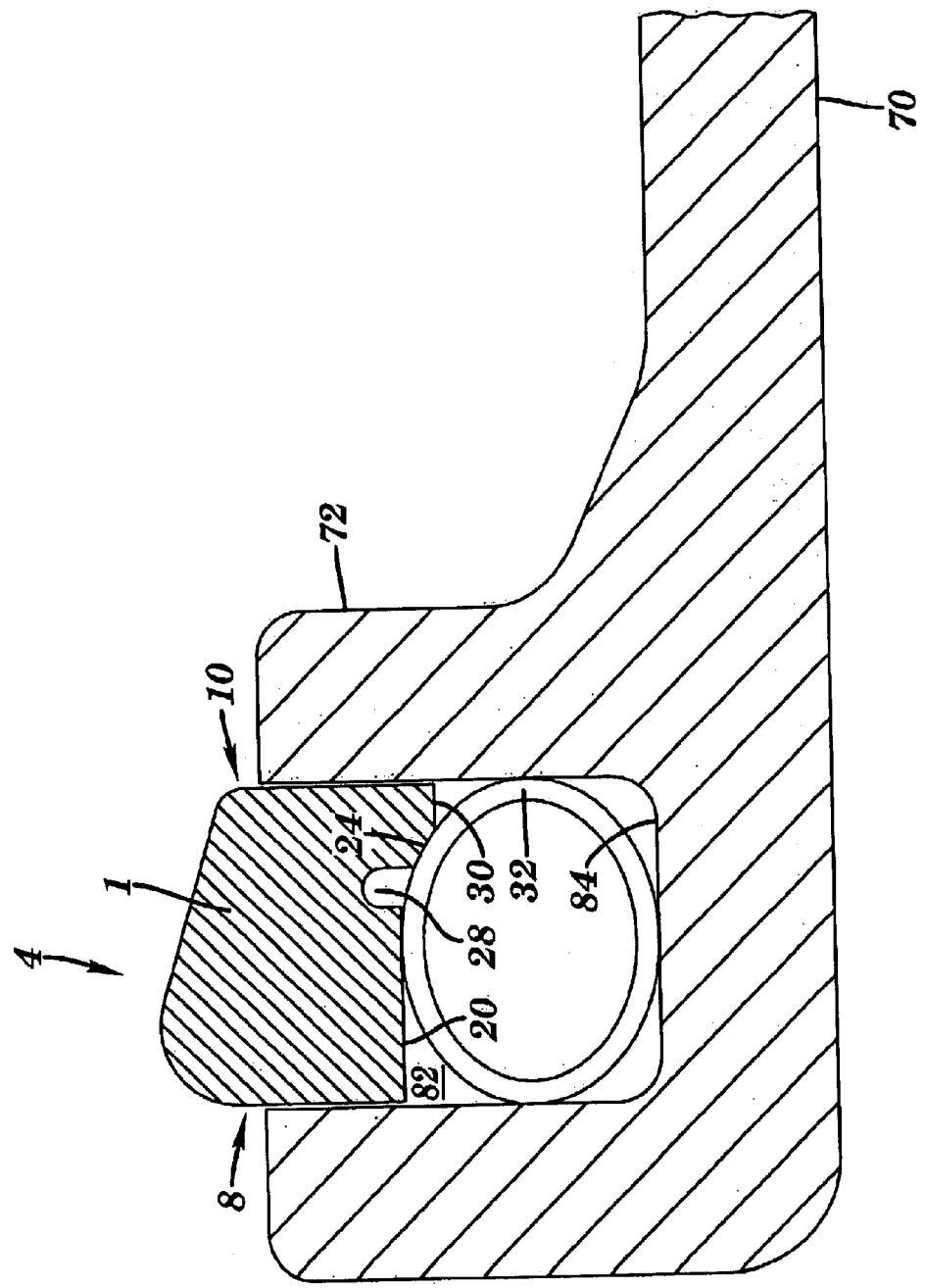
FIG. 5 provides a cross-sectional, magnified view of a top portion of the right-hand seal ring holder shown in FIG. 4. The view shows said seal ring holder portion prior to its insertion into the sleeve shown in FIG. 4 whereby the seal ring is shown in a free state.

FIG. 5 provides a magnified cross-sectional view of the top of the end portion 72 of seal ring holder 70. The view shows the sealing system installed on the seal ring holder at a time when the seal ring is in a free state, prior to the seal ring holder's insertion into the sleeve 42. One should note in the figure that the cross-section of the seal ring 1 is substantially identical to that shown in FIG. 3. As can be seen in the figure, end portion 72 of the holder 70 includes an exterior endless groove 82 into which is received the seal ring 1 atop the canted-coil spring 32.

Canted coil spring 32 is oriented whereby a line running through the center of all of its coils will form a circle that will be centered within the groove 82. In a canted-coil spring, a compression of the spring will take the form of the coil segments leaning over in the area where the load is causing the compression. As the coil segments lean over, the height of the coil, as measured upwardly from the base 84 of the groove, decreases.

It should be noted that other springs can be used with the seal ring 1 in place of the canted-coil spring 32 to create a sealing system in accordance with the invention. For example, in low or moderate temperature environments, the canted coil spring can be replaced with a resilient member, such as a rubber o-ring. While not having the gamut of favorable characteristics incorporated in a canted coil spring, a Marcel spring may also, in certain situations, be capable of being used with the seal ring 1. However, springs other than a canted-coil spring usually offer a lesser ability for height reduction during compression and may therefore make installation of the seal ring 1 into groove 82 much more difficult.

To reach the point shown in FIG. 5, it is advantageous to discuss the manner and process for installing the sealing system of the invention into the groove 82. This is especially important since the preferred installation features installing the seal ring in an uncut condition.

The canted-coil spring 32, when at rest, has a diameter that is less than the outer diameter of the end portion 72 of the seal ring holder 70. Therefore, the first step in the installation process is to gently expand the spring 32 until it fits over the end portion 72. One then places the spring into the holder's groove 82 and allows the spring to contract until it rests firmly upon the groove's base 84. At this point, the spring's coils will preferably be in a, free state wherein it is in a substantially non-compressed condition.

The next step is to place the seal ring 1 into the groove. It should be noted that the inner diameter of the seal ring (the maximum diametrical distance across the circle defined by the inner surface 6 of the seal ring) is less than the outer diameter of the seal ring holder's end portion 72. When the seal ring is made from PTFE, the seal ring will normally not have sufficient resiliency to enable it to be simply stretched over the end portion 72.

To achieve the installation when the seal ring 1 is made of PTFE, or a like material, one first places a portion of the seal ring over the seal ring holder's end portion 72 and then inserts said seal ring portion into the groove 82. One then uses the portion of the seal ring located in the groove to compress the portion of the spring 32 that it overlies. As the portion of the spring is compressed, the seal ring portion will move deeper into the groove, thereby causing the opposite end of the seal ring to move to a position where it is closer to being able to fit over the end 72 of the holder 70. One then inserts more of the seal ring into the groove, while maintaining the compression of the first portion of the spring. With each increase in the length of the seal ring within the groove, one makes a corresponding compression of the spring beneath the added portion of the seal ring. At this point, the installation process is somewhat similar to the process where one installs a bicycle tire on a rim, where one installs the tire incrementally.

Eventually, one can place the foot portion of the 'L' of the last segment of the seal ring that is not within the groove over the end 72 of the seal ring holder. The last portion of the seal ring can then be placed into the groove 82, with care being taken to ensure that the seal ring's side surfaces do not get pinched when one stops compressing the spring. At this point, the seal ring 1 is fully installed and a cross-sectional view of a portion of the seal ring is as provided in FIG. 5. It should be noted that for a satisfactory installation, the distance from the groove's base 84 to the inner surface portion 30 of the seal ring (at the point shown in FIG. 5) should be at least equal to one-half of the depth of groove 82.

At the point shown in FIG. 5, the seal ring's entire outer surface 4 is preferably protruding from the groove. Also at this point, the spring 32 should be experiencing little or no loading from the inner surface 6 of the seal ring 1. It should be noted that the inner surface 6 of the seal ring contacts the spring at two spaced-apart locations on opposite sides of the seal ring's groove 28. Besides the entire angled surface portion 24 contacting the spring, a part of the seal ring's planar surface portion 20 also contacts the spring. One should note that the latter contact area is located directly adjacent the groove 28. Both areas of contact closely match the contour of the adjacent portions of the spring.

Figure 6:
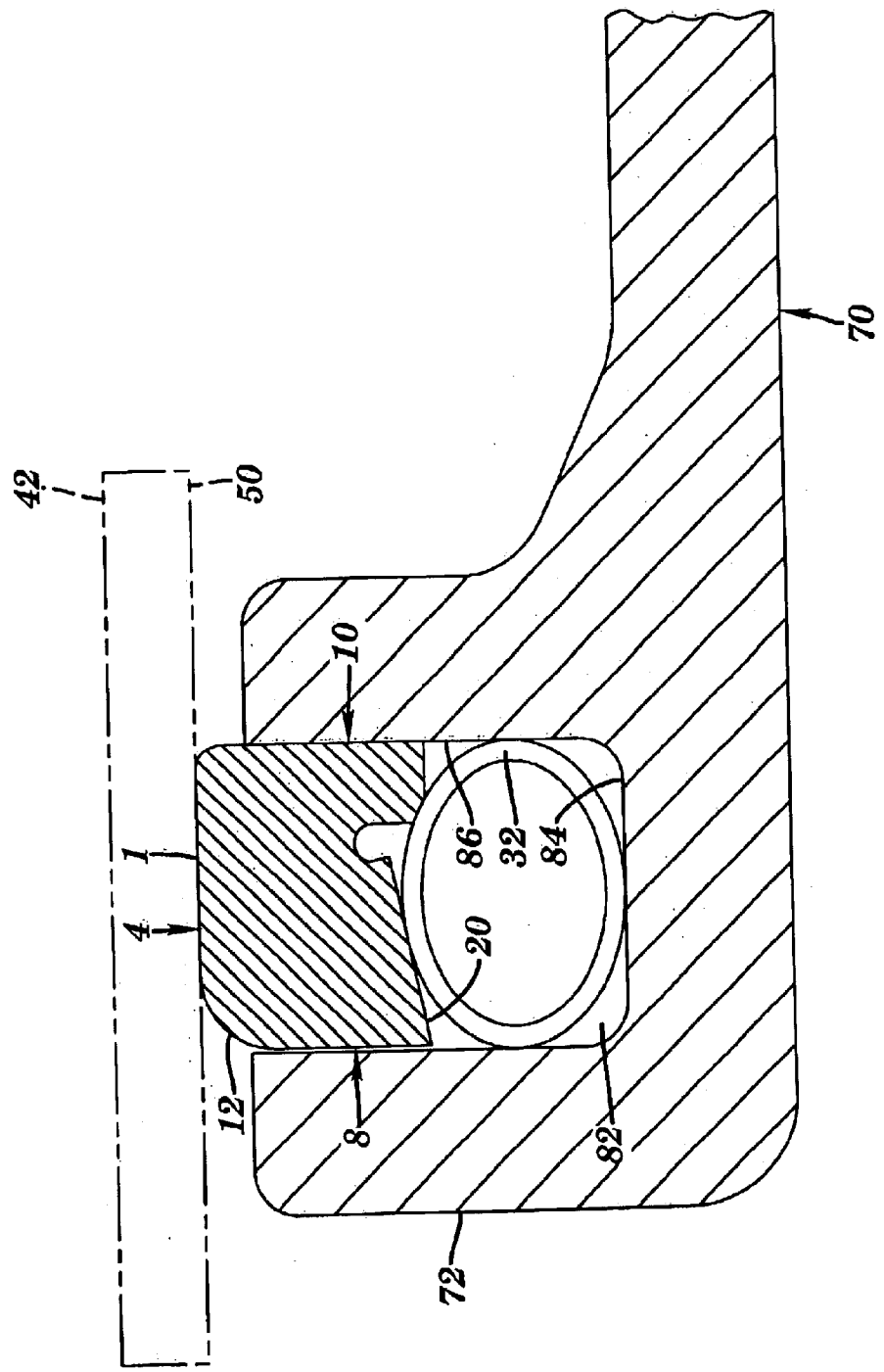
FIG. 6 provides a cross-sectional, magnified view of the same portion of the seal ring holder shown in FIG. 5, but at the time shown in FIG. 4 when said seal ring holder is located within the sleeve.

FIG. 6 provides a magnified cross-sectional view of the top of end portion 72 of seal ring holder 70 at a point when said holder is located within the sleeve 42. In this figure, one can see the seal ring's outer surface 4 sealingly-engaging the sleeve's inner surface 50. One can also see the canted coil spring 32 being compressed by the seal ring. Preferably, the spring will be about twenty to thirty percent compressed at this point.

In an uncompressed/free state, the outer diameter of the seal ring is greater than the inner diameter of the sleeve 44. One should note in FIG. 6 the changes caused in the seal ring due to its compressive contact with surface 50 of the sleeve.

As the seal ring holder 70 is inserted into the sleeve 42, the pressure applied to the outer surface 4 of the seal ring by the sleeve causes the seal ring's outwardly-protruding leading surface portion 12 to be forced inwardly toward the base 84 of the groove 82. The outer surface's trailing portion 14 is thereby also caused to deflect downwardly. As surface portion 12 moves inwardly, it causes a compression of spring 32 as the forward, major part of the seal ring, the part above surface portion 20, moves downwardly whereby it flexes and bends about the groove 28. It should be noted that the flexing of the groove is a result of the bending moment produced by the downward, off-center movement of surface portion 12. As can be seen in FIG. 6, after the seal ring has been fully received with the sleeve, substantially all of the seal ring's outer surface 4 has been reoriented and caused to change shape. It has flattened out into a planar shape that substantially matches the shape of the sleeve's inner surface 50. This maximizes the contact area between the seal ring and sleeve's inner surface 50. One should also note in FIG. 6 three other changes in the seal ring. Firstly, the changes in the shape of the seal ring's groove 28 wherein the groove's sidewalls are no longer parallel to each other. Secondly, the change in orientation of portion 20 of the seal ring's bottom surface 6 wherein said portion is no longer perpendicular to side surface 8, but is now oriented at an angle to said surface. And thirdly, the area of contact between the seal ring's inner surface portion 20 and the spring has changed wherein it has moved forward, away from the groove. All of these changes are a result of the seal ring's bending moment as the seal ring was pressed inwardly when the holder was inserted into the sleeve.

It should be noted that when fluid is contained within the coupling 40, there will be a combination of three forces that act together in a generally axial direction to push the seal ring tightly against the right-hand sidewall 86 of the groove. Firstly and predominantly, the fluid in the coupling will exert a considerable pressure force on the seal ring's front and bottom surfaces, 8 and 6 respectively. Secondly, there is the force applied by the spring on surfaces 20 and 24 of the seal ring. And thirdly, under some conditions, there is the resilience force created within the seal ring as the seal ring material tries to regain its original shape. This combination of forces results in a tight, leakage-free seal between the seal ring's rear side surface 10 and sidewall 86 of the groove.

Similarly, there would be a combination of three forces that act together in a radial direction to push the outer surface 4 of the seal ring against the inner surface 50 of the sleeve. Firstly and predominantly, there is the considerable pressure-created force applied by the system's fluid to the bottom surface 6 of the seal ring. Secondly, there is the force applied to the bottom surface of the seal ring by the spring 32. And thirdly, under some conditions, there is the resilience force created within the seal ring as the seal ring material tries to regain its original shape. This combination of forces results in a tight, leakage-free seal between the seal ring's outer surface and the inner surface of the sleeve.

Figure 7:
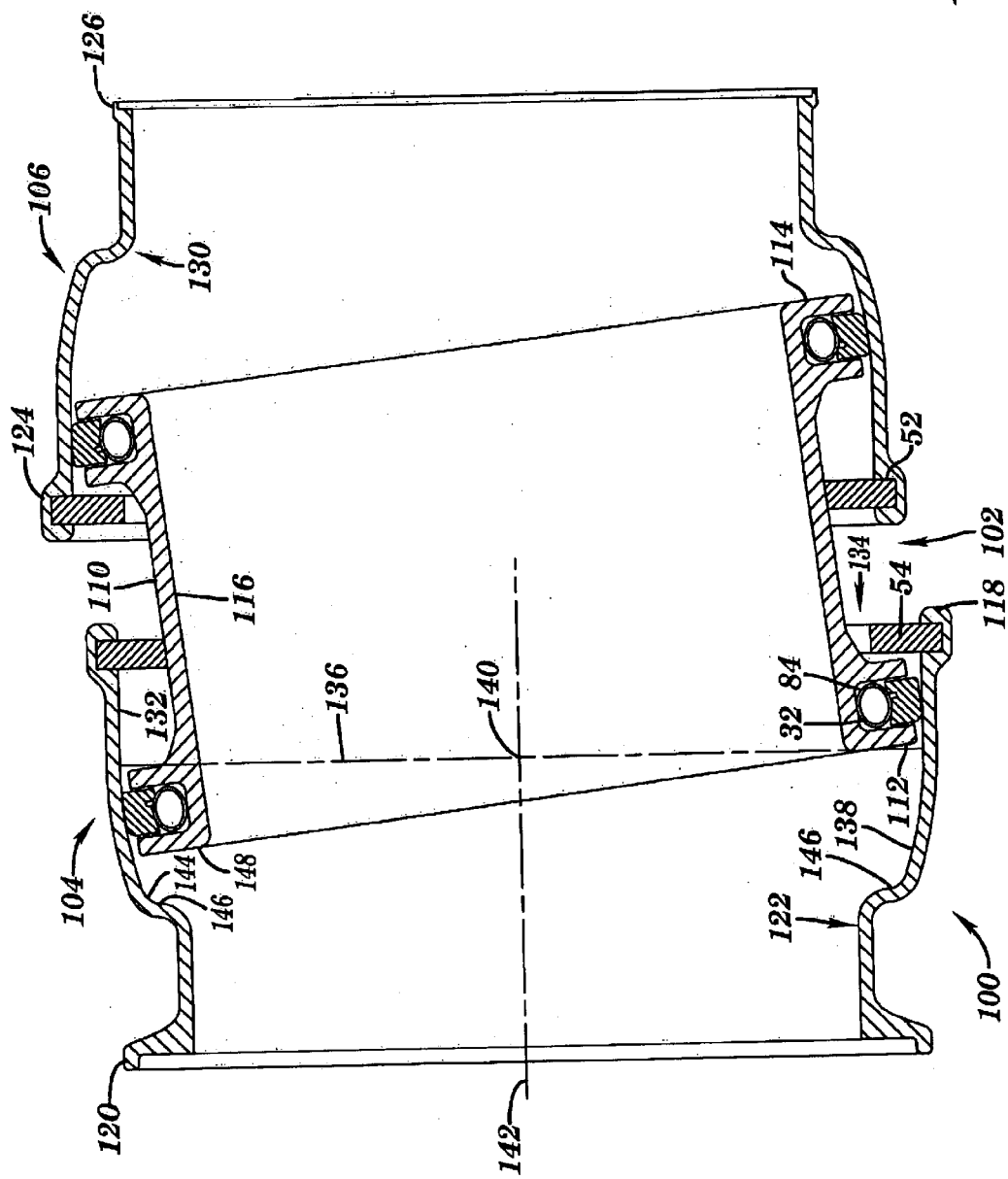
FIG. 7 provides a cross-sectional view of a second embodiment of a flexible coupling that employs a sealing system in accordance with the invention.

FIG. 7 shows a sealing system in accordance with the invention installed in two places within a second embodiment of a flexible coupling 100 designed to fluidically connect two tubular members (not shown). Unlike the previously described coupling shown in FIG. 4, this coupling includes a single, center-located seal ring holder 102 and first and second sleeves, 104 and 106 respectively. Furthermore, the two sleeves feature substantially identical inner surfaces that incorporate a unique design that provides improved control of the seal ring holder's travel.

The seal ring holder 102 has a center portion 110 and first and second end portions, 112 and 114 respectively. Each end portion includes an external endless groove 84 in which is located a sealing system in the form of a seal ring 1 that overlies a canted-coil spring 32. The sealing system is identical to that used in each of the seal ring holders shown in FIG. 4. The seal ring holder has a central thru-bore that creates a cylindrical interior area defined by the seal ring holder's inner surface 116.

The seal ring holder's first end portion 112 is located within sleeve 104. The sleeve is tubular in shape and has first and second end portions, 118 and 120 respectively. End portion 120 is adapted to enable it to be connected to an adjacent tubular member (not shown). Sleeve 104 has an inner area defined by its inner surface 122. End portion 112 of the seal ring holder is sealingly-engaged to sleeve 104 by virtue of the outer surface 4 of the seal ring 1 being pressed into the sleeve's inner surface 122 by spring 32 and by system pressure once the coupling is installed in a fluid system. In this manner, a leak-free seal is created between the end portion of the seal ring holder and the sleeve. The sleeve's inner surface includes an endless groove 52 into which is received a removable lock ring 54 that prevents the seal ring holder from detaching from sleeve.

The seal ring holder's second end portion 114 is similarly located within sleeve 106. The sleeve is tubular in shape and has first and second end portions, 124 and 126 respectively. End portion 126 is adapted to enable it to be connected to an adjacent tubular member (not shown). Sleeve 106 has an inner area defined by its inner surface 130. End portion 114 of the seal ring holder is sealingly-engaged to sleeve 106 as the seal ring 1 is pressed into the inner surface 130 of the sleeve by spring 32 and by system pressure once the coupling is installed in a fluid system. End portion 124 of the sleeve also includes an endless groove 52 into which is received a removable lock ring 54 that prevents the seal ring holder 102 from detaching from the sleeve.

Sleeves 104 and 106 both have inner surfaces that are substantially identical. Therefore, a description of the inner surface of sleeve 104 will apply to the same general areas of sleeve 106.

The inner surface 122 of sleeve 104 is a compound surface that includes a first surface portion 132 that defines a cylindrical area having a uniform diameter. During assembly of the coupling, when the lock rings are loosely installed on the center portion 110 of the ring holder, end portion 112 of the seal ring holder is inserted through an opening 134 in the sleeve's end portion 118. The seal ring 1 then engages surface portion 132 to effect a sealing engagement between the two structures. The constant diameter in this interior area of the sleeve facilitates the insertion of the seal ring holder into said area.

Surface portion 132 ends at a transition zone 136 that is in the form of a circle and is indicated by a phantom line in FIG. 7. To the left of the transition zone, one can see that the inner area of the sleeve narrows down and is defined by a second surface portion 138. Surface portion 138 is in the form of a truncated sphere that has a constant radius about an origin point 140 located at the intersection of the sleeve's longitudinal axis 142 and the center of a plane extending through zone 136. The use of a spherical configuration for surface portion 138 creates an area defined by said surface that narrows in an initially gradual manner, followed by an ever increasing rate of narrowing. Surface portion 138 ends at a radiused corner 144 that transitions to a vertical wall 146. The wall forms a leftmost stop for the leftward travel of the seal ring holder within the sleeve 104. It should be noted that surface portions 132 and 138 are shown approximately equal in length. Surface portion 132 is preferably at least one-quarter of the combined length of portions 132 and 138. This enhances the angulation capability of the seal ring holder relative to the sleeve. Angulation is herein defined as a movement of one structure relative to another and includes both axial travel and angular movements.

The spherical shape of surface portion 138 provides a unique functionality. As the seal ring holder moves further and further to the left, the narrowing of the area defined by surface portion 138 of the sleeve will cause a consequent increase in the compression of the sealing system's spring 32. However, unlike a conventional cylindrical area, the spherical shape causes the spring to be compressed at an increasing rate as the seal ring holder moves further to the left. As a result, it takes an increasing amount of effort to move the seal ring holder to the left. In this manner, the coupling design inherently provides a bias against the seal ring holder moving to the maximum amount to the left, where a metal-to-metal contact would occur between the end surface 148 of the seal ring holder and wall 146 of the sleeve.

It should be noted that while a sealing system in accordance with the invention is shown being used in two different flexible couplings, said system can be used in any type of coupling or joint. Furthermore, while two forms of seal ring holder have been shown and described, a seal ring holder can be any structure that includes an external groove adapted for receiving a seal ring and spring in accordance with the invention.

It should also be noted that the seal ring and/or spring can be removed and replaced. In this manner, a user can replace an existing sealing system in accordance with the invention with a new one. One can similarly replace a prior art seal located within a groove of proper dimensions with a new sealing system in accordance with the invention. Alternatively, a user can markedly change the performance characteristics of a sealing system in accordance with the invention by replacing the seal ring 1 with a similar seal ring 1 that is made of a material that has different properties. A similar replacement can be made with the spring 32.

The preferred embodiments of the invention disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. A sealing system for creating a fluid barrier-type seal between two interfitting structures, said sealing system comprising:
    a spring in the form of an annulus;
    a seal ring in the form of an annulus, wherein said seal ring has a radially-located outer surface that faces away from a center axis of said seal ring and, when viewed in radial cross-section, includes an outwardly-protruding, arcuately-shaped first portion and a trailing second portion, and wherein said seal ring has a radially-located inner surface that faces toward said center axis and includes first and second portions separated by a groove; and
    wherein when said spring is placed within a complementary endless groove located on an outer surface of a first structure, and said seal ring is then placed in said groove in a manner wherein it overlies said spring, and wherein when said first structure is inserted into a second structure that has an inner surface that presses on said outer surface of said seal ring, the arcuately-shaped first portion of said outer surface of said seal ring will be pressed inwardly toward said spring, thereby compressing said spring and causing at least a portion of said seal ring to flex about said groove in said seal ring and cause a reorientation of the seal ring's outer surface.

2. The sealing system of claim 1 wherein said spring is in the form of a canted-coil spring.

3. The sealing system of claim 1 wherein when said outer surface of said seal ring becomes reoriented, it assumes a flattened shape that substantially matches the inner surface of said second structure.

4. The sealing system of claim 1 wherein said seal ring, when in a non-compressed state, has an 'L'-shaped radial cross-section.

5. The sealing system of claim 4 wherein after said spring and said seal ring are placed within said groove in the outer surface of said first structure and said first structure is inserted within said second structure, if said second structure is then caused to contain a fluid with the sealing system preventing fluid from leaking out of said second structure, the seal ring will be oriented whereby the top end of the 'L' of the seal ring's 'L'-shaped cross-section will face the fluid, and be acted upon by the fluid's pressure, while the foot portion of the 'L' will be forced into a wall of said groove of said first structure.

6. The sealing system of claim 1 wherein said second portion of the seal ring's outer surface, when viewed in cross-section, is in the form of a substantially straight line and, when in an unloaded condition, has a first orientation relative to an adjacent side surface of said seal ring, and wherein when said spring and said seal ring are located in said groove of said first structure and said first structure is inserted into said second structure, said first orientation will change and said second portion of the seal ring's outer surface will become substantially perpendicular to the adjacent side surface of said seal ring.

7. The sealing system of claim 1 wherein the seal ring is made of a material that is at least partially made up of PTFE.

8. The sealing system of claim 1 wherein prior to the seal ring's installation into said groove of said first structure, a radially-oriented cross-section through a portion of the seal ring will show the first portion of said inner surface of the seal ring as a straight line that is substantially parallel to the seal ring's center axis.

9. The sealing system of claim 8 wherein after the spring and seal ring have been installed in said groove of said first structure and said first structure is placed within said second structure, a radially-oriented cross-section through a portion of the seal ring will show the first portion of said inner surface of the seal ring as a substantially straight line that is at a significant angle relative to the seal ring's center axis.

10. The sealing system of claim 1 wherein once said spring and said seal ring are placed within said groove of said first structure and said seal ring overlies said spring, a portion of said second portion of the seal ring's inner surface will contact a portion of said spring and be oriented at an angle that substantially matches the orientation of said portion of said spring.

11. The sealing system of claim 1 wherein prior to said first structure being inserted into said second structure, when said seal ring is installed in said groove and overlies said spring, both of said first and second portions of the seal ring's inner surface will be in contact with said spring, wherein said inner surface's first portion will have a first area of contact with said spring and said inner surface's second portion will have a second area of contact with said spring, and wherein both of said first and second areas of contact will be located substantially adjacent said groove in said inner surface of said seal ring.

12. The sealing system of claim 11 wherein after said first structure is inserted into said second structure and while said outer surface of said seal ring is contacting said inner surface of said second structure, the first area of contact between the first portion of the seal ring's inner surface and the spring will be spaced from said groove in said inner surface of said seal ring.

13. The sealing system of claim 1 wherein said seal ring can be installed in said groove in said first structure without being cut.

14. A sealing system for creating a fluid barrier-type seal between two interfitting structures, said sealing system comprising:
    a canted-coil spring in the form of an annulus;
    a seal ring in the form of an annulus, wherein said seal ring has a radially-located outer surface that faces away from a center axis of said seal ring and includes, when viewed in a radial cross-section, an outwardly-protruding minor portion in a leading position and a substantially straight major portion in a trailing position, and wherein said seal ring has a radially-located inner surface that faces toward said center axis and includes first and second portions separated by a groove, wherein said first portion accounts for a major portion of said inner surface and wherein said second portion includes first and second connected segments; and
    wherein said spring is capable of being placed within an endless groove located on an outer surface of a first structure, wherein said seal ring is capable of being placed in said groove in a manner wherein it overlies said spring and parts of both of said first and second portions of the seal ring's inner surface contact said spring, and wherein if said spring and seal ring are located in the groove of the first structure and said first structure is inserted into a second structure that has an inner surface that presses on said outer surface of said seal ring, said minor portion of said outer surface of said seal ring will be pressed inwardly toward said spring, thereby causing a compression of said spring and causing at least a portion of said seal ring to flex about said groove in said seal ring.

15. A flexible coupling capable of connecting first and second tubular members to enable the transfer of fluid therebetween, said coupling comprising:
    a tubular sleeve having a cylindrical inner area defined by an inner surface of said sleeve;
    a seal ring holder that has a thru-bore and includes first and second end portions, wherein said first end portion of said seal ring holder is capable of being located within said inner area of said sleeve and includes an external endless groove;
    a spring in the form of an annulus located within said groove in said seal ring holder;
    a seal ring in the form of an annulus located within said groove and positioned wherein it overlies said spring, wherein said seal ring has a radially-located outer surface that faces away from a center axis of said seal ring and, when in an unloaded condition, includes a leading, outwardly-protruding first portion and a trailing second portion, wherein said seal ring has a radially-located inner surface that faces toward said center axis and includes first and second portions separated by a groove; and
    wherein when said seal ring holder is inserted into said sleeve, said inner surface of said sleeve will press on and thereby apply a load to said outer surface of said seal ring and cause the first portion of said outer surface of said seal ring to be pressed inwardly toward said spring, thereby compressing said spring and causing at least a portion of said seal ring to flex about said groove in said seal ring as the outer surface of the seal ring assumes a configuration that substantially matches said inner surface of said sleeve.

16. The flexible coupling of claim 15 wherein said spring is in the form of a canted-coil spring.

17. The flexible coupling of claim 15 wherein said spring is made of a metal material.

18. The flexible coupling of claim 15 wherein said seal ring, when in an unloaded condition, has an 'L'-shaped cross-section.

19. The flexible coupling of claim 18 wherein when the first end portion of said seal ring holder is located in said sleeve, if said sleeve is then caused to contain a fluid with the seal ring preventing fluid from leaking out of said sleeve, the seal ring will be oriented whereby the top end of the 'L' of the seal ring's 'L'-shaped cross-section will face the fluid, and be acted upon by the fluid's pressure, while the foot portion of the 'L' will be forced into a wall of said groove of said seal ring holder.

20. The flexible coupling of claim 15 wherein said second portion of the seal ring's outer surface, when seen in cross-section, is in the form of a substantially straight line and, when in an unloaded condition, has a first orientation relative to an adjacent side surface of said seal ring, and wherein when said seal ring holder is inserted into said sleeve, said first orientation will change and said second portion of the seal ring's outer surface will become substantially perpendicular to the adjacent side surface of said seal ring.

21. The flexible coupling of claim 15 wherein the seal ring is made of a material that is at least partially made up of PTFE.

22. The flexible coupling of claim 15 wherein when the seal ring is in an unloaded condition, a radially-oriented cross-section through a portion of the seal ring will show the first portion of said inner surface of the seal ring as a straight line that is substantially parallel to the seal ring's center axis.

23. The flexible coupling of claim 22 wherein when the first end portion of said seal ring holder is located in said sleeve, a radially-oriented cross-section through a portion of the seal ring will show the first portion of said inner surface of the seal ring as a substantially straight line that is at a significant angle relative to the seal ring's center axis.

24. The flexible coupling of claim 15 wherein when said seal ring holder is located exterior to the sleeve and said seal ring is in an unloaded condition, a portion of said second portion of the seal ring's inner surface will contact a portion of said spring and be oriented at an angle that substantially matches the orientation of said portion of said spring.

25. The flexible coupling of claim 15 wherein when said seal ring holder is located exterior to the sleeve and said seal ring is in an unloaded condition, both of said first and second portions of the seal ring's inner surface will be in contact with said spring, wherein said inner surface's first portion will have a first area of contact with said spring and said inner surface's second portion will have a second area of contact with said spring, and wherein both of said first and second areas of contact will be located proximate said groove in said inner surface of said seal ring.

26. The sealing system of claim 25 wherein when the first end portion of said seal ring holder is inserted into said sleeve, said first area of contact between the first portion of the seal ring's inner surface and the spring will move away from said groove in said inner surface of said seal ring.

27. The sealing system of claim 15 wherein said seal ring is in an uncut condition.

* * * * *